(12) United States Patent
Parameswaran et al.

(10) Patent No.: US 10,429,200 B1
(45) Date of Patent: Oct. 1, 2019

(54) DETERMINING ADJUSTED TRIP DURATION USING ROUTE FEATURES

(71) Applicant: Uber Technologies, Inc., San Francisco, CA (US)

(72) Inventors: Vasudev Parameswaran, Fremont, CA (US); Mohammed Waleed Kadous, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 59 days.

(21) Appl. No.: 15/595,852

(22) Filed: May 15, 2017

(51) Int. Cl.
*G01C 21/34* (2006.01)
*G08G 1/01* (2006.01)

(52) U.S. Cl.
CPC ....... *G01C 21/3492* (2013.01); *G08G 1/0129* (2013.01); *G08G 1/0137* (2013.01)

(58) Field of Classification Search
CPC .... G01C 21/34; G01C 21/3492; G01C 21/36; G01C 21/3691; G01C 21/3697; G08G 1/0129; G08G 1/207; G08G 1/0137
See application file for complete search history.

(56) References Cited

U.S. PATENT DOCUMENTS

| | | | |
|---|---|---|---|
| 5,068,656 A * | 11/1991 | Sutherland | G08G 1/127 340/989 |
| 6,950,745 B2 | 9/2005 | Agnew et al. | |
| 6,989,765 B2 | 1/2006 | Gueziec | |
| 7,610,145 B2 | 10/2009 | Kantarjiev et al. | |
| 8,362,894 B2 | 1/2013 | Shah | |
| 2004/0102896 A1* | 5/2004 | Thayer | G08G 1/207 701/522 |
| 2004/0193368 A1* | 9/2004 | Sanqunetti | G06T 3/60 701/468 |
| 2005/0159883 A1* | 7/2005 | Humphries | B60R 25/00 701/517 |
| 2008/0065318 A1* | 3/2008 | Ho | G01C 21/3407 701/465 |
| 2010/0049428 A1* | 2/2010 | Murata | G01C 21/3492 701/118 |

(Continued)

FOREIGN PATENT DOCUMENTS

| | | | | |
|---|---|---|---|---|
| DE | 102005002872 A1 * | 9/2005 | ......... | G01C 21/3453 |
| JP | 2010008068 A * | 1/2010 | | |

OTHER PUBLICATIONS

EPO machine translation of DE 102005002872 (original DE document published Sep. 29, 2005) (Year: 2005).*

*Primary Examiner* — Behrang Badii
*Assistant Examiner* — David A Testardi
(74) *Attorney, Agent, or Firm* — Fenwick & West LLP (57) ABSTRACT

A system adjusts an estimated travel time from an origin to a destination to better predict an actual trip duration. The system receives a route from a specified origin and destination. The system receives an estimated trip duration corresponding to the generated route. A machine learned model improves the estimated trip duration by applying data about past trips facilitated by the system and data about traffic-control features associated with a route. For example, the system may use counts of a number of road signs and a number of traffic signals located along the generated route to predict an actual trip duration. In some cases, the system may additionally use data about synchronized traffic lights to predict actual trip duration.

17 Claims, 7 Drawing Sheets

(56) References Cited

U.S. PATENT DOCUMENTS

| | | | |
|---|---|---|---|
| 2011/0224893 A1* | 9/2011 | Scofield | G01C 21/3492 |
| | | | 701/119 |
| 2012/0010807 A1* | 1/2012 | Zhou | G01C 21/3492 |
| | | | 701/423 |
| 2012/0029800 A1* | 2/2012 | Kluge | G01C 21/32 |
| | | | 701/117 |
| 2013/0080046 A1* | 3/2013 | Jeong | G08G 1/168 |
| | | | 701/408 |
| 2013/0166204 A1* | 6/2013 | Davies | G01C 21/00 |
| | | | 701/533 |
| 2013/0204514 A1* | 8/2013 | Margulici | G08G 1/0112 |
| | | | 701/119 |
| 2013/0204521 A1* | 8/2013 | Liu | G01C 21/3492 |
| | | | 701/423 |
| 2014/0129121 A1* | 5/2014 | Fino | G01C 21/34 |
| | | | 701/117 |
| 2014/0136088 A1* | 5/2014 | Nikovski | G08G 1/01 |
| | | | 701/117 |
| 2014/0336913 A1* | 11/2014 | Fino | G01C 21/34 |
| | | | 701/117 |
| 2016/0202074 A1* | 7/2016 | Woodard | G06Q 10/047 |
| | | | 701/465 |
| 2017/0314950 A1* | 11/2017 | Tian | G01C 21/3484 |

* cited by examiner

| Route Identification 510 | Estimated Time 515 | Ns (Stop Sign Count) 520 | Nt (Traffic Signal Count) 525 | Actual Time 530 |
|---|---|---|---|---|
| 3QM51 | 20 | 8 | 6 | 28 |
| 6NM22 | 37 | 4 | 2 | 32 |
| 877AV | 9 | 1 | 5 | 16 |
| ... | ... | ... | ... | ... |

DETERMINING ADJUSTED TRIP DURATION USING ROUTE FEATURES

BACKGROUND

Field of Art

This disclosure relates generally to estimating trip duration, and in particular to improving trip duration estimates using machine learning.

Description of Art

Computerized systems provide a way of determining routes to destination addresses. The computerized systems can find user-specified addresses on a map, and/or provide routes between multiple addresses. Mapping and routing can have various applications, such as helping groups of people coordinate travel and directing drivers of vehicles to locations the drivers may be unfamiliar with.

SUMMARY

The above and other needs are met by methods, non-transitory computer-readable storage media, and computer systems for improving trip duration estimates.

Examples described herein provide a computer-implemented method for improving trip duration estimates. In one example, the method includes receiving a route from an origin to a destination and receiving an estimated trip duration corresponding to the route. The method also includes determining one or more traffic-control features along the route. The method further includes predicting an adjusted trip duration by applying a machine learned model to one or more traffic-control features determined along the route and to the estimated trip duration, and transmitting the adjusted trip duration to a user device.

Furthermore, examples herein provide a non-transitory computer-readable storage medium storing computer program instructions executable by one or more processors of a system to perform steps including receiving a route from an origin to a destination, receiving an estimated trip duration corresponding to the route, determining one or more traffic-control features along the route, predicting an adjusted trip duration by applying a machine learned model to the determined traffic-control features and the estimated trip duration, and transmitting the adjusted trip duration to a user device.

Still further, a computer system includes one or more computer processors for executing computer program instructions and a non-transitory computer-readable storage medium storing instructions executable by the one or more processors to perform steps comprising improving trip duration estimates by receiving a route from an origin to a destination, receiving an estimated trip duration corresponding to the route, determining one or more traffic-control features along the route, predicting an adjusted trip duration by applying a machine learned model to the determined traffic-control features and the estimated trip duration, and transmitting the adjusted trip duration to a user device.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Mapping systems can generate estimated trip duration values related to determined routes. However, estimated trip duration values can be inaccurate since not all features along a route that may have an effect on travel speed are accounted for in trip duration calculations. For example, existing trip duration calculations do not make use of data about road signs and traffic signals along a route. In part, this lack of route feature integration in trip duration estimations is due to difficulties related to automatically identifying significant traffic-control features in street level imagery. That is, existing solutions for automatically determining exact locations of detected traffic-control features and automatically identifying roads and/or directionality with which particular features correspond can be fairly inaccurate.

A system improves a trip duration estimate by making adjustments to an estimated trip duration based on traffic-control features along a route. Traffic-control features may be any features that may have an effect on traffic speed along a route. Such traffic-control features may include signage, signals, lights, and other signals for instructing a driver's travel. For example, a user may receive information about the amount of time a provider will take to reach a pickup location. As another example, a user may receive information about how long a trip from the current location of the user to another location will take. In particular, the system calculates an estimated time of arrival along a route by summing an estimated time to traverse each segment of the route (or based on an average speed of each segment). Such estimates can be based on historical traffic data, real-time traffic data, or a combination of both. In some sense, the estimated time of arrival implicitly takes into account features of the road segments, such as road signs and traffic signals.

In one embodiment, a computer model is trained to predict a more accurate trip duration explicitly using stored data about traffic-control features such as a number of road signs and traffic signals along a route. In some embodiments, a traffic-control feature may be included as a feature for the computer model even when the traffic-control feature does not control (or is not intended for) traffic control for a specific road or approach to the traffic-control feature in the route. This may also account for situations in which the road or approach for a traffic-control feature is not accurately determined. For example, traffic-control features may be automatically identified. As an example of this automatic identification, a camera on a vehicle may capture an image of a stop sign along a route. The stop sign may be included in a view from an intersection, but a road which the stop sign applies to may not be automatically determined. Thus, these types of traffic-control features may be used in embodiments to predict trip duration although they are not specifically associated with a road or route. The more accurate predicted trip duration may be transmitted to the user.

Figure 1:
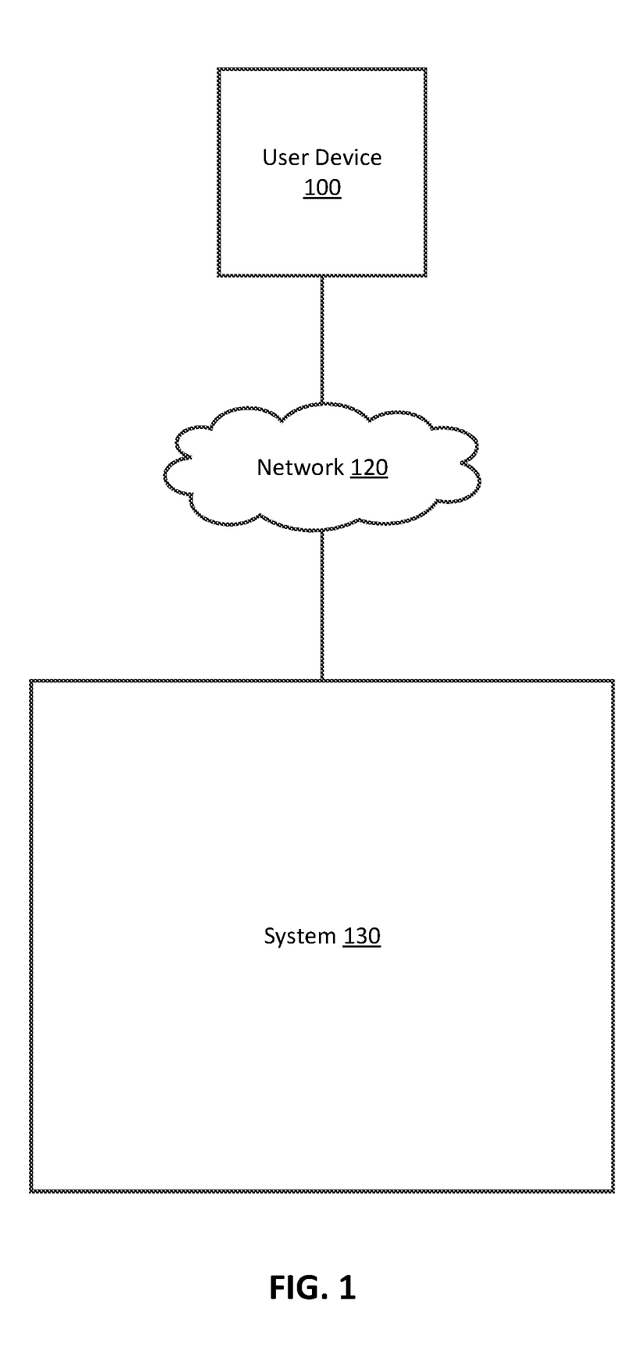
FIG. 1 is a high-level block diagram of a system environment for a system, in accordance with some embodiments.

FIG. 1 is a high-level block diagram of a system environment for a system 130, in accordance with some embodiments. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. The system 130 may provide routing, direction, and timing information to the user device 100. In some embodiments, the system 130 may coordinate travel for a user, for example, by matching the user with a provider who can transport the user, items, or services to a destination requested by the user. In some embodiments, the system 130 may report timing information about a requested route to the user, for example, by providing the user with a trip duration estimate and/or an estimated time of arrival (ETA) in response to origin and destination locations provided by the user. In cases in which the system 130 matches the user with a provider to transport the user, the system 130 may provide an ETA of the provider at a pickup location based on a route generated to connect the provider's current location to the pickup location.

The system 130 can estimate a length of time (duration) that a trip from a given origin to a given destination will take. In some embodiments the system uses machine learned models to adjust an estimated trip duration. The system 130 may use traffic-control features along a route to alter the estimated trip duration such that it more accurately represents an actual trip duration. Route features are map features that are associated with a route (e.g., associated with road segments included in a route, within a region that contains a part of the route, etc.). Route features may include traffic-control features, such as a count of the number of stop signs and/or a count of the number of traffic signals. For example, a duration of a trip taken in a car can be affected by a number of stop signs and traffic signals the car passes, which may not be accounted for in typical trip duration estimation systems. In one example, an estimated trip duration is generated for the route based on the individual road segments, for example by modeling the trip as a networking traversal problem, associating weights to nodes and links connecting nodes. This estimated trip duration may be modified by the system 130 using a machine learned model that accounts for additional features of the route to improve the estimated trip duration. This machine learned model may account for traffic-control features or other characteristics that are not otherwise accounted for, and this machine learned model may also address systemic over—or under—estimates by the duration estimate system.

A user may enter origin and destination information and/or request transportation from the system 130 through a user device 100. User devices 100 can be personal or mobile computing devices, such as smartphones, tablets, or notebook computers. In some embodiments, the user device 100 executes a client application that uses an application programming interface (API) to communicate with the system 130 through the network 120.

In some embodiments, a user can make a trip request to the system 130 through operation of the user device 100. For example, a trip request may include one or more of user identification information, a number of passengers for the trip, a requested type of the provider (e.g., a vehicle type or service option identifier), the current location and/or the pickup location (e.g., a user-specific location, or a current location of the user device 100), and a trip destination. The current location of the user device 100 may be designated by the user or detected using a location sensor of the user device 100 (e.g., a global positioning system (GPS) receiver).

User devices 100 may interact with the system 130 through client applications configured to interact with the system 130. The client applications of the user devices 100 can present information received from the system 130 on a user interface, such as a map of the geographic region, the current location of the user device 100, estimated trip duration, and/or an ETA associated with a trip request. The client application running on the user device 100 may be able to determine the current location and provide the current location to the system 130.

The user devices 100 can communicate with the system 130 via the network 120, which may comprise any combination of local area and wide area networks employing wired or wireless communication links. In some embodiments, all or some of the communication on the network 120 may be encrypted.

Figure 2:
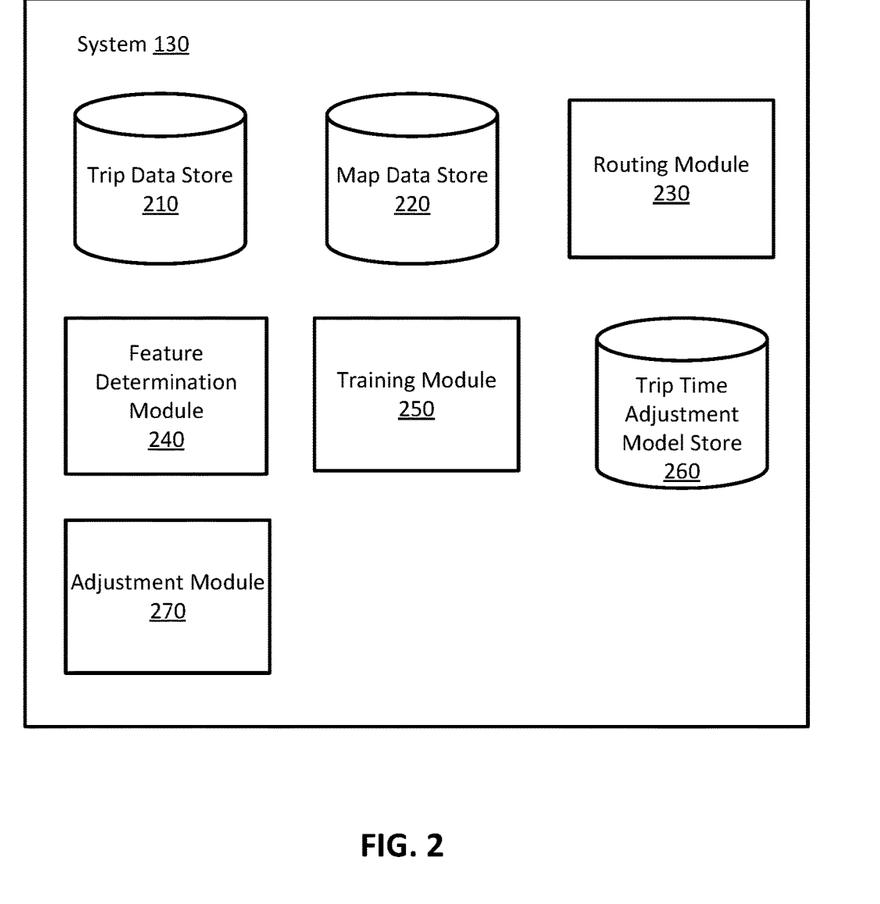
FIG. 2 is a block diagram of a system architecture for the system, in accordance with some embodiments.

FIG. 2 is a high-level block diagram of a system architecture for the system 130, in accordance with some embodiments. The system 130 includes various modules and data stores to determine routes and/or estimate trip durations. The system 130 comprises a trip data store 210, a map data store 220, a routing module 230, a feature determination module 240, a training module 250, a trip time adjustment model store 260, and an adjustment module 270. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The trip data store 210 stores data related to one or more past trips facilitated by the system 130. Trip data may include information about one or more of an origin and a destination of a trip, a route taken between the origin and the destination, a time of the trip, and an identification of a user who requested the trip. Stored trip information can also include route features such as traffic-control features (e.g., traffic signals and road signs), an estimated trip duration generated at the time a trip was requested, and actual trip duration.

The map data store 220 stores maps of geographic regions in which the system 130 generates routes and/or offers trip coordination services. The maps contain information about roads within the geographic regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

The map data store 220 also includes map features, which may be stored in association with regions, road segments, and/or routes. Map features can include road features that describe characteristics of a map, such as placement of road signs, speed limits, road directionality (e.g., one-way, two-way), traffic history, traffic conditions, addresses on a road segment, lengths of road segments, and road segment type (e.g., surface street, residential, highway, toll). Map features that may affect traffic and/or travel speeds may be considered traffic-control features, according to some embodiments. The map properties can also include features associated with intersections, such as road sign placement, the presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties. These characteristics may not be associated with individual roads or identify a particular road segment to which the characteristics (such as a traffic signal) apply. For example, the location of many traffic signals or road signs may be determined based on automated collection systems, for example by vehicles capturing images of roads during travel. These automated collection systems may identify such characteristics, but unreliably associate these characteristics with a particular road segment or approach to an intersection.

In some embodiments, the map data store 220 stores information about virtual delineations of regions (e.g., geofences). A geofence is a virtual perimeter geographically enclosing a portion of map data. Geofences are used to delineate specific geographic regions and may be applied for various reasons, such as categorization or alerts. In one embodiment, a large region is subdivided into many smaller regions using geofences, and data about map features is collected with respect to effects and/or presence within individual geofences. Geofences may be established along political boundaries (e.g., city borders), census tracts, neighborhood outlines, using arbitrary grid cells (e.g., an overlay of hexagons on a map), and/or as a group of grid cells selected based on one or more characteristics of the region corresponding to the cells.

The routing module 230 generates a route between an origin and a destination. A route may be a path along a series of road segments that connects an origin location with a destination location. The routing module 230 may optimize a route between an origin and a destination in a variety of ways. For example, a particular route may be selected for its short distance, lack of left turns, avoidance of toll roads, short estimated duration, etc. The routing module 230 also generates an estimated trip duration for a trip taken along the generated route. The routing module 230 uses map data stored in the map data store 220 to generate a route and an estimated trip duration. Typically, the estimated trip duration determined by the routing module 230 is determined based on an analysis of the road segments in a route, for example by modeling the trip as a series of road segments and identifying a weight (or estimated time to traverse) for each road segment. In one embodiment, an estimated duration for a route may be determined based on an accumulation of such identified weights of each road segment in the route. Because various features may not be adequately represented in these models, these models may not account for characteristics of the route that are not specifically associated with the traversed road segments. In some embodiments, the routing module 230 additionally uses past user data stored in the trip data store 210 to generate a route.

The feature determination module 240 determines traffic-control features for use by the adjustment models to modify an estimated trip duration. The feature determination module 240 identifies those traffic-control features that may be present along a generated route. The feature determination module 240 receives information about a generated route from the routing module 230. Information about a generated route may include road segments involved in the route, data about directionality along specific road segments, and/or other map data related to routing. Additionally, the feature determination module 240 obtains information about traffic-control features along a generated route from the map data store 220. In one embodiment, the feature determination module 240 determines a set of geofences in the map data store 220 through which the route passes. Traffic-control features are selected from data that is associated with the determined geofences. For example, if a route passes through several geofences, the feature determination module 240 may count a number of stop signs that are present within each of the geofences. In some embodiments, map data about features from other geofences (e.g., geofences that share an edge with the geofences through which a route passes) are also considered when traffic-control features are determined for a route.

The training module 250 trains one or more trip time adjustment models. Trip time adjustment models predict actual trip time based on an estimated trip duration determined for a route by the system and data about traffic-control features that are present along the route. In one embodiment, the trip time adjustment models are machine learned models. An initial estimate of a trip duration may be generated by another module or system, such as the routing module 230, which can be adjusted by models trained by the training module 250 to adjust the estimated duration of the trip.

An embodiment of the training module 250 generates one or more trip time adjustment models from previously predicted trip duration estimates and actual trip durations using supervised machine learning. The training module 250 trains and validates the models using training data derived from past trip data stored in the trip data store 210. The training module 250 uses routing data, map data about traffic-control features along routes, and estimated trip duration values from past trips with associated actual trip duration information as training and validation data for training the models. In one embodiment, the trip time adjustment models are retrained using updated training data on a periodic basis, such as every week, bi-week, or month. In some embodiments, the trip time adjustment models are retrained whenever updated training data is received. The trip time adjustment model store 260 stores one or more machine learned models as trained by the training module 250.

The adjustment module 270 applies a trip time adjustment model to the generated route data and the feature information to determine an adjustment to make to the estimated trip duration that was generated by the routing module 230. The adjustment module 270 uses traffic-control features such as a number of street signs along a route and a number of traffic signals along the route, as well as the estimated time of arrival to determine an adjusted time of arrival. In some embodiments, the adjustment module 270 transmits a resulting adjusted time of arrival to a user device 100 from which a trip request originated.

Figure 3:
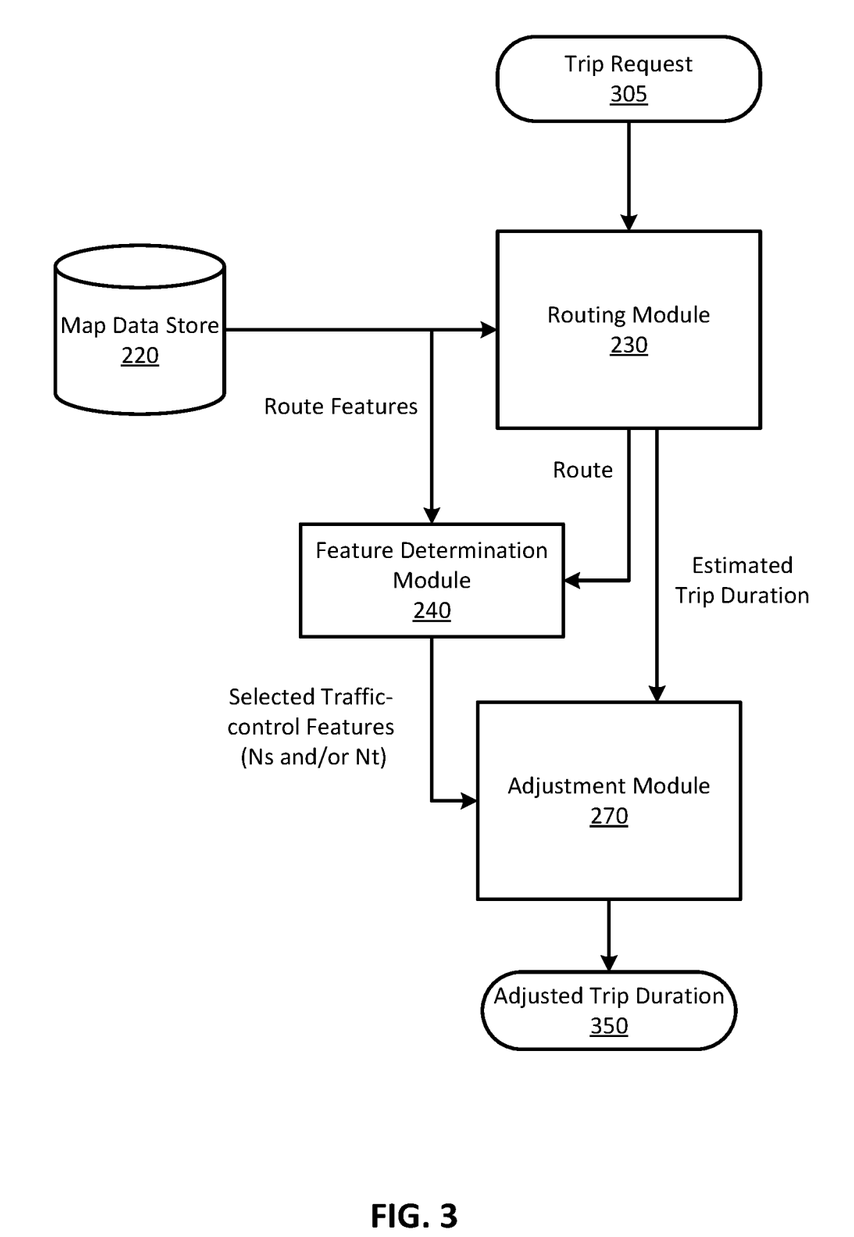
FIG. 3 is a data flow diagram illustrating a process of determining an adjusted trip time, in accordance with an embodiment.

FIG. 3 is a data flow diagram illustrating a process of determining an adjusted trip time, in accordance with an embodiment. The routing module 230 receives a trip request 305 from a user device 100. A trip request 305 may include an origin location and a destination location. The routing module 230 uses map data (e.g., information about road segments and intersections) from the map data store 225 to generate a route that connects the origin location and the destination location as specified in the trip request 305.

The feature determination module 240 obtains information about traffic-control features associated with the route that was generated by the routing module 230. In one embodiment, the feature determination module 240 determines a set of selected traffic-control features along the generated route, such as information about traffic signage, based on information about route features stored in the map data store 225 (e.g., determining a number of signs along a route where variables $N_s$ represents a number of stop signs and $N_t$ represents a number of traffic signals).

The adjustment module 270 uses selected traffic-control features, such as data about the signs along the route and an estimated trip duration to predict an adjusted trip duration 350. In one embodiment, an adjusted trip duration 350 is predicted using a trip time adjustment model. In some embodiments, the adjustment module 270 can be used selectively based on one or more factors (e.g., during normal commute times, within certain geofences, along road segments that are known to have heavy traffic, depending on trip length, etc.). That is, the estimated trip duration as generated by the routing module 230 may be provided to users without adjustment by the adjustment module 270.

Figure 4:
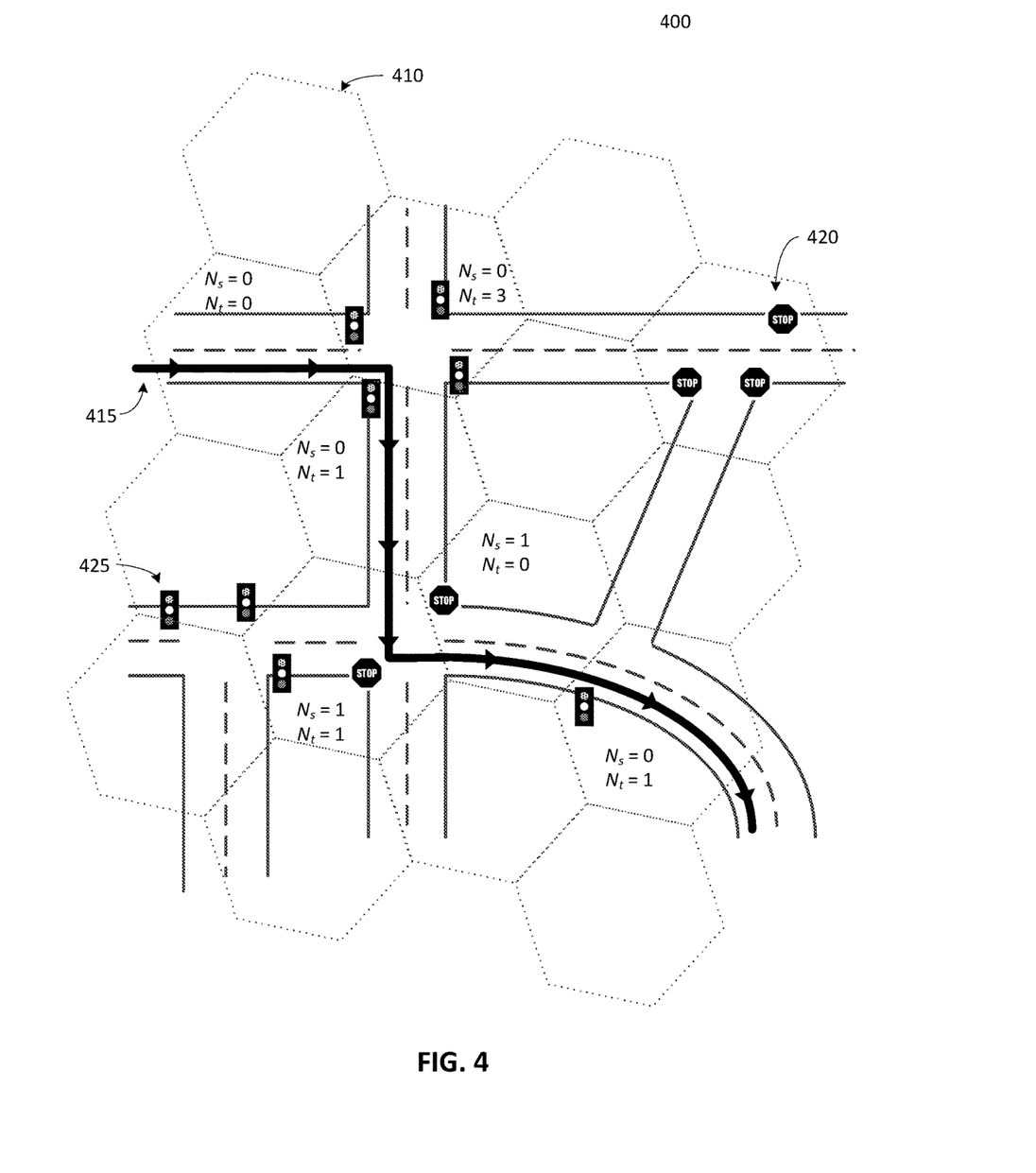
FIG. 4 illustrates example map data along a route, in accordance with an embodiment.

FIG. 4 illustrates example map data along a route, in accordance with an embodiment. Such map data may be stored in the map data store 220. A portion of a map 400 shows several road segments and intersections. The map 400 is overlaid with hexagonal geofence cells 410. A portion of a route 415 includes some of the road segments in the map 400. The map data includes map features such as stop signs 420 and traffic signals 425.

In one embodiment (as shown in FIG. 4), the feature determination module 240 determines traffic-control features by counting traffic signals 425 and stop signs 420 along the route 415. Traffic-control features may be considered to be along a route 415 if the features are located within a geofence cell 410 through which the route 415 passes. As shown in this example, the traffic-control features may be associated with geofences and may not be specifically associated with road segments or individual intersections. Thus, the route may be associated with traffic-control features that are not directly encountered by the road segments along which the route travels. The example route 415 passes through six of the geofence cells 410 shown in FIG. 4. For each of the geofence cells 410 through which the route 415 passes, the feature determination module 240 counts a number of stop signs (also denoted $N_s$) and counts a number of traffic signals (also denoted $N_t$) that are present within the geofence cell 410, according to data from the map data store 220. The feature determination module 240 aggregates feature data associated with each of the geofence cells 410 along the route 415, for example, by summing the number of traffic signals 425 detected in each of the geofence cells 410. For example, the feature determination module 240 may determine that there are a total of $N_s=2$ stop signs 420 along the route 415 and a total of $N_t=6$ traffic signals 425 along the route 415. In one embodiment, the map data store 220 stores information about traffic-control features with relation to geofence cells 410 in which the features are located (e.g., a geofence cell 410 maintains a count of the number of stop signs and the number of traffic signals it contains). The adjustment module 270 may use these values when applying a trip time adjustment model to determine an adjusted trip duration for a trip taken along the route 415.

In some embodiments, map data stored in the map data store 220 includes information about whether traffic signals are synchronized. For example, a sequence of traffic signals along a road may be set such that a signal turns green in time for vehicles arriving from the previous signal to pass through an intersection without stopping. To account for such synchronization, the count of traffic signals may be adjusted according to the number of traffic signals along the route before a turn or other change in direction along the route. Thus, sequential traffic signals may receive a lower or partial score. When a turn is encountered by the route, the value of a traffic signal may be re-started. For example, three traffic signals may appear along a road, followed by a fourth traffic signal. The second and third traffic signal may be treated as less than a whole traffic signal, for example as 0.8 and 0.6 respectively. After the turn, the fourth traffic signal may receive full value again for a traffic signal and receive a value of 1. In addition to turns, traffic signals may also receive full value if there was no prior signal within a threshold distance.

Traffic-control features may be grouped in various ways. In different embodiments, the geofence cells 410 may vary in size and/or shape. For example, the geofence cells 410 may be hexagons with sides that are 8 meters long. In some embodiments, the feature determination module 240 also incorporates features located in geofence cells 410 that are associated with the route 415 in other ways, such as by being adjacent to geofence cells 410 the route passes through. That is, feature information from geofence cells 410 may be included as weighted values such that feature counts for geofence cells 410 that the route 415 does not pass through are included with a weight indicative of a distance of the geofence cell 410 from a geofence cell 410 through which the route 415 does pass. Incorporating weighted feature values for nearby geofence cells 410 may mitigate effects of uncertainty present in feature data (e.g., errors in the position data for stop signs 420).

Figure 5:
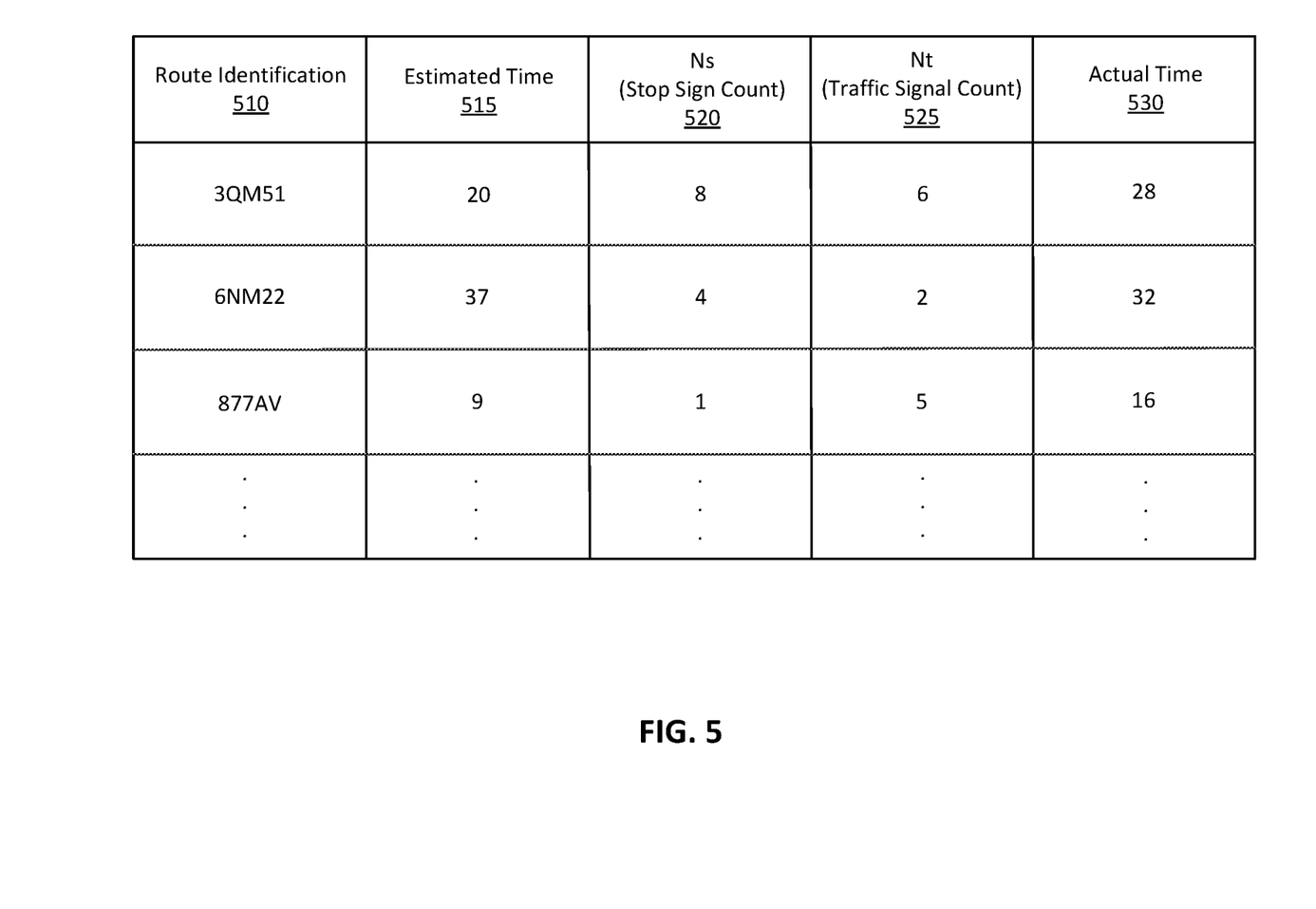
FIG. 5 is a table showing example training data for a trip time adjustment model, in accordance with an embodiment.

FIG. 5 is a table showing example training data for a trip time adjustment model, in accordance with an embodiment. The training module 250 uses training data to train trip time adjustment models, as stored in the trip time adjustment model store 260. Training data may include feature vectors of data from past trips taken by users of the system 130 incorporating route information, information about an estimated time generated for a route, and/or data about map features with respect to a route. Examples of possible feature vector data include estimated trip duration values, Haversine distance between an origin and a destination, data about sequences of synchronized traffic signals along a route, a number of road signs, and a number of junctions. Training data in the example of FIG. 5 includes a route identification 510 (e.g., a reference to route details), an estimated trip time 515, a stop sign count 520, and a traffic signal count 525. In embodiments that incorporate data about synchronized traffic signals, a decreasing weighting factor may be applied to values representing successive synchronized traffic signals along a road. In such cases, the weighting factor may be reset after a turn in the generated route, or when map data indicates that the next traffic signal is not synchronized with the previous signal. Training data may additionally include validation data. The example of FIG. 5 includes data about actual trip time 530 as validation data. In one embodiment, the training data is obtained from the trip data store 210 and/or the map data store 220.

The training module 250 uses training data to train one or more trip time adjustment models. In some embodiments, a trip time adjustment model is a supervised machine learned model for predicting an outcome. Trip time adjustment models may use techniques such as gradient boosted regression and linear regression.

Figure 6:
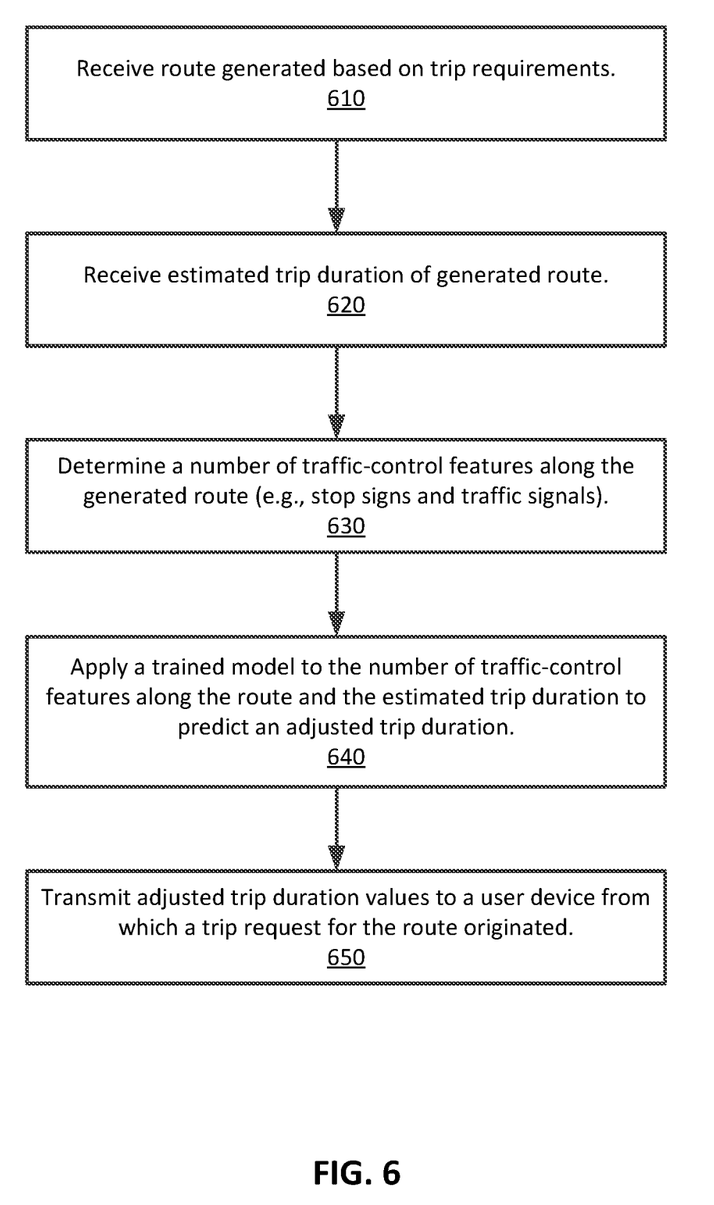
FIG. 6 is a flowchart illustrating a process for predicting an adjusted trip duration, in accordance with an embodiment.

FIG. 6 is a flowchart illustrating a process for predicting an adjusted trip duration, in accordance with an embodiment. A system 130 receives 610 a route generated based on trip requirements. Trip requirements may include an origin and a destination submitted to the system 130 by a user via a user device 100. The system 130 receives 620 an estimated trip duration for the generated route. In some embodiments, a route and a corresponding estimated route duration are generated by a routing module 230.

A feature determination module 240 determines 630 a number of traffic-control features along the generated route. For example, the feature determination module 240 may determine a number of stop signs and a number of traffic signals along the generated route. In some embodiments, the feature determination module 240 may evaluate traffic-control features based on metrics other than quantity (e.g. ratings related to road quality, speed limits, whether a merge lane is present, etc.).

The system 130 applies 640 a trained trip time adjustment model to the determined traffic-control features along the route and the estimated trip duration. The machine learned model predicts an adjusted trip duration and/or adjusted time of arrival corresponding to the generated route. In some embodiments, the system 130 transmits 650 the adjusted time of arrival to a user device 100 from which a trip request for the generated route originated.

Figure 7:
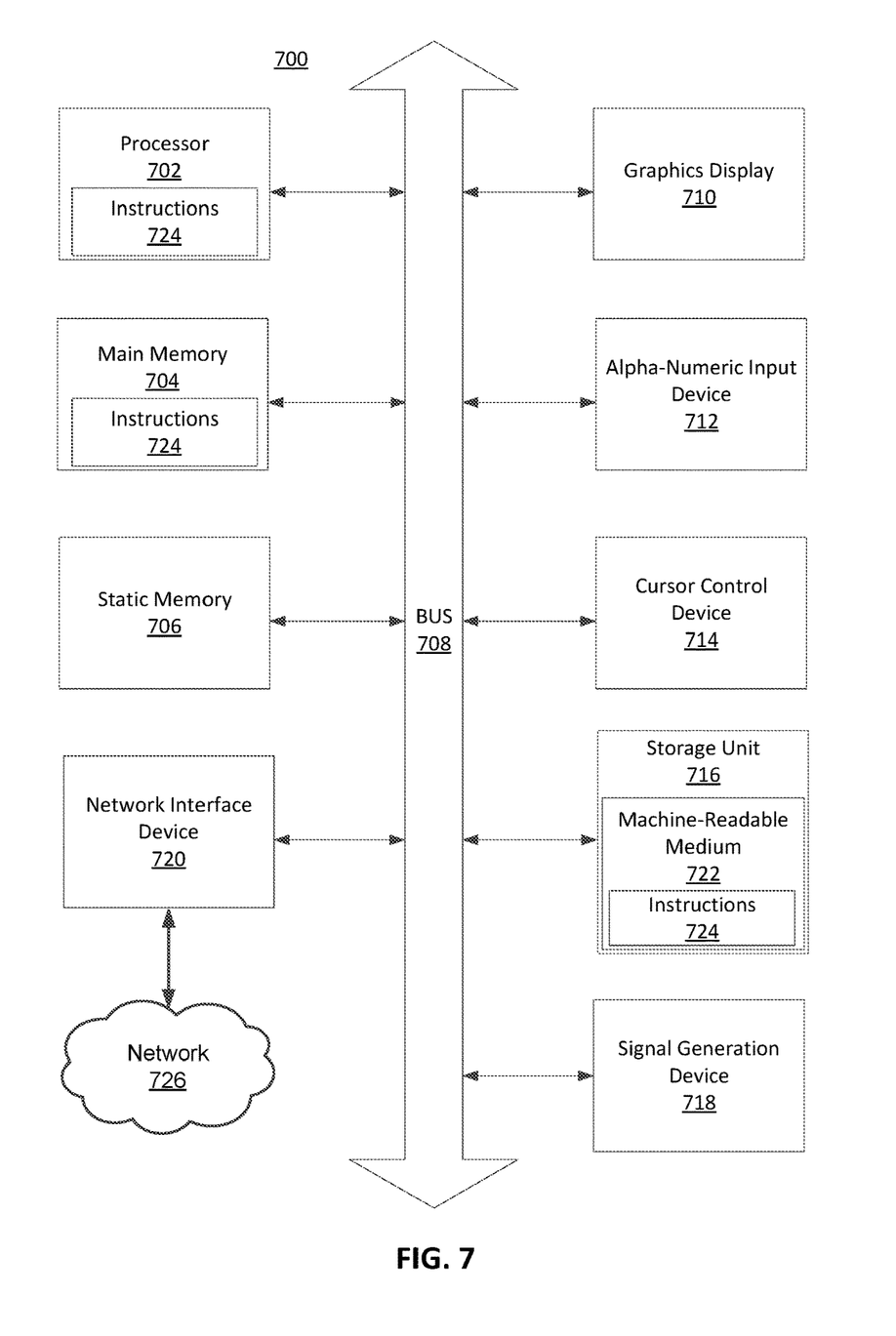
FIG. 7 is a block diagram illustrating components of an example machine able to read instructions from a machine-readable medium and execute them in one or more processors.

FIG. 7 is a block diagram illustrating components of an example machine able to read instructions from a machine-readable medium and execute them in one or more processors (or controllers). Specifically, FIG. 7 shows a diagrammatic representation of system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 706 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the training module 250, the routing module 230, the feature determination module 240, and/or the adjustment module 270. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
    storing information about geofence cells that subdivide a geographical region, each geofence cell being stored with an indication of traffic-control features located within the geofence cell;
    receiving a route from an origin to a destination, the route passing through the geographical region;
    receiving an estimated trip duration corresponding to the route;
    selecting, from the geofence cells that subdivide the geographical region, a set of geofence cells through which the route passes;
    determining, using the stored information about geofence cells that subdivide the geographical region, a set of traffic-control features that are located within the selected set of geofence cells through which the route passes;
    predicting an adjusted trip duration by applying a machine learned model to the determined set of traffic-control features and the estimated trip duration; and
    transmitting the adjusted trip duration to a user device.

2. The computer-implemented method of claim 1, wherein the estimated trip duration is determined by a model that traverses a graph and accumulates weights for road segments corresponding to the route.

3. The computer-implemented method of claim 1, wherein the determined set of traffic-control features includes at least one of: a count of a number of road signs located within the geofence cells included in the selected set of geofence cells and a count of a number of traffic signals located within the geofence cells included in the selected set of geofence cells.

4. The computer-implemented method of claim 1, wherein determining a set of traffic-control features that are located within the selected set of geofence cells through which the route passes further comprises:
    determining values associated with traffic-control features located within one or more geofence cells through which the route passes; and
    determining additional values associated with additional traffic-control features located within one or more geofence cells through which the route does not pass, the additional values being affected by weighting coefficients based on a distance of the geofence containing the additional traffic-control features from a geofence through which the route passes.

5. The computer-implemented method of claim 1, wherein determining a set of traffic-control features that are located within the selected set of geofence cells through which the route passes comprises:
    determining sequences of synchronized traffic signals along the route, wherein a sequence of synchronized traffic signals includes two or more synchronized traffic signals located at successive intersections on a road along the route; and
    for each sequence of synchronized traffic signals:
        calculating a weighted sum of the number of traffic signals in the sequence, wherein each subsequent traffic signal in the sequence of synchronized traffic signals has a smaller weighting coefficient than the previous traffic signal in the sequence of synchronized traffic signals.

6. The computer-implemented method of claim 1, wherein an adjusted trip duration is predicted responsive to the route including road segments that are known to have heavy traffic.

7. A non-transitory computer-readable storage medium storing computer program instructions executable by one or more processors of a system to perform steps comprising:
    storing information about geofence cells that subdivide a geographical region, each geofence cell being stored with an indication of traffic-control features located within the geofence cell;
    receiving a route from an origin to a destination, the route passing through the geographical region;
    receiving an estimated trip duration corresponding to the route;
    selecting, from the geofence cells that subdivide the geographical region, a set of geofence cells through which the route passes;
    determining, using the stored information about geofence cells that subdivide the geographical region, a set of traffic-control features that are located within the selected set of geofence cells through which the route passes;
    predicting an adjusted trip duration by applying a machine learned model to the determined set of traffic-control features and the estimated trip duration; and
    transmitting the adjusted trip duration to a user device.

8. The non-transitory computer-readable storage medium of claim 7, wherein the estimated trip duration is determined by a model that traverses a graph and accumulates weights for road segments corresponding to the route.

9. The non-transitory computer-readable storage medium of claim 7, wherein the determined set of traffic-control features includes at least one of: a count of a number of road signs located within the geofence cells included in the selected set of geofence cells and a count of a number of traffic signals located within the geofence cells included in the selected set of geofence cells.

10. The non-transitory computer-readable storage medium of claim 7, wherein determining a set of traffic-control features that are located within the selected set of geofence cells through which the route passes further comprises:
  determining values associated with traffic-control features located within one or more geofence cells through which the route passes; and
  determining additional values associated with additional traffic-control features located within one or more geofence cells through which the route does not pass, the additional values being affected by weighting coefficients based on a distance of the geofence containing the additional traffic-control features from a geofence through which the route passes.

11. The non-transitory computer-readable storage medium of claim 7, wherein determining a set of traffic-control features that are located within the selected set of geofence cells through which the route passes comprises:
  determining sequences of synchronized traffic signals along the route, wherein a sequence of synchronized traffic signals includes two or more synchronized traffic signals located at successive intersections on a road along the route; and
  for each sequence of synchronized traffic signals:
    calculating a weighted sum of the number of traffic signals in the sequence, wherein each subsequent traffic signal in the sequence of synchronized traffic signals has a smaller weighting coefficient than the previous traffic signal in the sequence of synchronized traffic signals.

12. The non-transitory computer-readable storage medium of claim 7, wherein an adjusted trip duration is predicted responsive to the route including road segments that are known to have heavy traffic.

13. A computer system comprising:
  one or more computer processors for executing computer program instructions; and a non-transitory computer-readable storage medium storing instructions executable by the one or more computer processors to perform steps comprising:
    storing information about geofence cells that subdivide a geographical region, each geofence cell being stored with an indication of traffic-control features located within the geofence cell;
    receiving a route from an origin to a destination, the route passing through the geographical region;
    receiving an estimated trip duration corresponding to the route;
    selecting, from the geofence cells that subdivide the geographical region, a set of geofence cells through which the route passes;
    determining, using the stored information about geofence cells that subdivide the geographical region, a set of traffic-control features that are located within the selected set of geofence cells through which the route passes;
    predicting an adjusted trip duration by applying a machine learned model to the determined set of traffic-control features and the estimated trip duration; and
    transmitting the adjusted trip duration to a user device.

14. The computer system of claim 13, wherein the estimated trip duration is determined by a model that traverses a graph and accumulates weights for road segments corresponding to the route.

15. The computer system of claim 13, wherein the determined set of traffic-control features includes at least one of: a count of a number of road signs located within the geofence cells included in the selected set of geofence cells and a count of a number of traffic signals located within the geofence cells included in the selected set of geofence cells.

16. The computer system of claim 13, wherein determining a set of traffic-control features that are located within the selected set of geofence cells through which the route passes further comprises:
  determining values associated with traffic-control features located within one or more geofence cells through which the route passes; and
  determining additional values associated with additional traffic-control features located within one or more geofence cells through which the route does not pass, the additional values being affected by weighting coefficients based on a distance of the geofence containing the additional traffic-control features from a geofence through which the route passes.

17. The computer system of claim 13, wherein determining a set of traffic-control features that are located within the selected set if geofence cells through which the route passes comprises:
  determining sequences of synchronized traffic signals along the route, wherein a sequence of synchronized traffic signals includes two or more synchronized traffic signals located at successive intersections on a road along the route; and
  for each sequence of synchronized traffic signals:
    calculating a weighted sum of the number of traffic signals in the sequence, wherein each subsequent traffic signal in the sequence of synchronized traffic signals has a smaller weighting coefficient than the previous traffic signal in the sequence of synchronized traffic signals.

\* \* \* \* \*